(12) United States Patent
Kolbe

(10) Patent No.: US 10,513,073 B2
(45) Date of Patent: Dec. 24, 2019

(54) SCRAPING DEVICE FOR A ROTARY PRESS, ROTARY PRESS, AND METHOD FOR OPERATING A ROTARY PRESS

(75) Inventor: Sven Kolbe, Büchen (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 878 days.

(21) Appl. No.: 14/116,300

(22) PCT Filed: Apr. 19, 2012

(86) PCT No.: PCT/EP2012/001684
§ 371 (c)(1),
(2), (4) Date: Jan. 24, 2014

(87) PCT Pub. No.: WO2012/152368
PCT Pub. Date: Nov. 15, 2012

(65) Prior Publication Data
US 2014/0145362 A1  May 29, 2014

(30) Foreign Application Priority Data

May 10, 2011 (DE) .................... 10 2011 101 287

(51) Int. Cl.
*B29C 43/50* (2006.01)
*B29C 48/92* (2019.01)
(Continued)

(52) U.S. Cl.
CPC ............ *B29C 48/92* (2019.02); *B30B 11/005* (2013.01); *B30B 11/08* (2013.01); *B30B 15/32* (2013.01);
(Continued)

(58) Field of Classification Search
CPC ........... B29C 47/92; B29C 2947/92114; B29C 2947/92409; B29C 2947/92609;
(Continued)

(56) References Cited

U.S. PATENT DOCUMENTS 3,063,390 A * 11/1962 Frank .................... B30B 11/005
141/83
5,017,119 A * 5/1991 Tokoi ....................... B26D 1/29
264/142
(Continued)

FOREIGN PATENT DOCUMENTS

DE  20 2005 017 516   1/2006
DE  10 2007 057 791   12/2010
(Continued)

OTHER PUBLICATIONS

English Abstract of JP 58-107295 submitted with Information Disclosure Statement dated Nov. 7, 2013.
(Continued)

*Primary Examiner* — Seyed Masoud Malekzadeh
(74) *Attorney, Agent, or Firm* — Vidas Arrett & Steinkraus P.A.

(57) ABSTRACT

A scraping device for a rotary press comprising at least one scraping element for scraping pellets located on a die plate of the rotary press to an outlet, wherein the at least one scraping element has at least one identification and/or position unit having identification and/or position data relating to the at least one scraping element, and wherein the scraping device further comprises a read and/or write unit which is designed to communicate with the at least one identification and/or position unit in order to read the identification and/or position data from the at least one identification and/or position unit. The invention also relates to a rotary press and a corresponding method.

6 Claims, 2 Drawing Sheets

(51) Int. Cl.
  *B30B 11/00* (2006.01)
  *B30B 11/08* (2006.01)
  *B30B 15/32* (2006.01)

(52) U.S. Cl.
  CPC ............... *B29C 2948/92114* (2019.02); *B29C 2948/92409* (2019.02); *B29C 2948/92609* (2019.02); *B29C 2948/92866* (2019.02)

(58) Field of Classification Search
  CPC ......... B29C 2947/92866; B30B 11/005; B30B 11/08; B30B 15/32; B30B 11/085; B30B 11/10; B30B 11/006
  USPC ............. 425/139, 150, 169, 345, 348 R, 435
  See application file for complete search history.

(56) References Cited

U.S. PATENT DOCUMENTS

| | | | | |
|---|---|---|---|---|
| 6,332,765 | B1* | 12/2001 | Spelleken | B29B 9/065 264/142 |
| 7,648,353 | B2* | 1/2010 | Meier | B30B 11/005 425/173 |
| 8,293,153 | B2* | 10/2012 | Isozumi | B30B 11/005 264/109 |
| 2005/0263926 | A1* | 12/2005 | Tazawa | B30B 11/005 264/109 |
| 2006/0013914 | A1* | 1/2006 | Shimada | B05B 5/032 425/408 |
| 2007/0029691 | A1* | 2/2007 | Nakamura | B29C 43/34 264/109 |
| 2009/0152751 | A1* | 6/2009 | Roemer | B30B 11/005 264/40.1 |
| 2009/0243132 | A1* | 10/2009 | Schmidt | B30B 11/08 264/40.5 |
| 2011/0001253 | A1* | 1/2011 | Isozumi | B30B 11/005 264/40.1 |
| 2014/0234463 | A1* | 8/2014 | Ozeki | B30B 11/08 425/217 |

FOREIGN PATENT DOCUMENTS

| | | | | |
|---|---|---|---|---|
| EP | 1338409 | | 8/2003 | |
| EP | 2036707 | | 3/2009 | |
| EP | 2239133 | | 10/2010 | |
| JP | 58107295 | | 7/1983 | |
| JP | 58107296 | | 7/1983 | |
| JP | 2000271793 | A * | 10/2000 | ........... B30B 11/005 |

OTHER PUBLICATIONS

English Abstract of JP 58-107296 submitted with Information Disclosure Statement dated Nov. 7, 2013.

* cited by examiner

SCRAPING DEVICE FOR A ROTARY PRESS, ROTARY PRESS, AND METHOD FOR OPERATING A ROTARY PRESS

CROSS-REFERENCE TO RELATED APPLICATIONS

This application is a U.S. National Stage Application which claims priority to PCT/EP2012/001684, filed Apr. 19, 2012, which claims priority to DE 10 2011 101 287.0 filed May 10, 2011, the entire contents of both of which are hereby incorporated by reference.

STATEMENT REGARDING FEDERALLY SPONSORED RESEARCH

Not applicable

BACKGROUND OF THE INVENTION

The invention relates to a scraping device for a rotary press comprising at least one scraping element for scraping pellets located on a die plate of the rotary press to an outlet. Furthermore, the invention relates to a rotary press comprising a control device and a rotor that can normally rotate about a vertical axis, wherein the rotor has an upper and lower punch guide for lower and upper press punches and a die plate between the punch guides, wherein the press punches interact with openings in the die plate, furthermore comprising at least one filling and dosing station in which the material to be pressed is added to the openings, furthermore comprising at least one pressing station that, during operation, interacts with the upper press punches and the lower press punches such that they press the material located in the openings into pellets, and comprising at least one ejector station in which the pellets are conveyed out of the openings onto the die plate.

The invention relates to a method for operating a rotary press in which material added to holes of a die plate is pressed by upper and lower punches into pellets, the pellets are then conveyed onto the die plate and scraped off the die plate by a scraping element to an outlet.

An example of a rotary press is disclosed in DE 10 2007 057 791 B4. In addition to at least one filling and dosing station in which the material to be pressed is added to openings in the die plate, and a pressing station in which the material added to the openings is pressed by means of upper and lower press punches into pellets, especially tablets, such rotary presses also comprise in particular an ejector station. In the ejector station, the produced tablets are normally conveyed to the top side of the die plate by raising the lower punch. A stationary scraping element downstream in the direction of rotation of the rotor scrapes the tablets located on the rotating die plate off of the die plate, and conveys them into an outlet that for example leads to a discharge channel. Such scraping elements generally also comprise a sorting nozzle that sorts out tablets to be sorted out due to poor quality by means of directed compressed air into a reject channel.

Generally, pellets of different sizes are produced with such rotary presses. The scraping elements frequently comprise a crescent along which the pellets are guided to the outlet under the effect of the die plate which continues to advance by rotation under the stationary scraping elements. Depending on the size of the tablets, especially their diameter or another characteristic dimension if the shape is not circular, the scraping elements are individually positioned in order to ensure proper guidance by the scraping elements. This is generally done manually by an operator. Normally, the scraping element is pushed by the operator in a radial direction across the die plate in order to adapt it to the different tablet diameters or dimensions.

This known procedure is associated with several problems. On the one hand, repositioning the scraping element can change the angle between the sorting nozzle and tablets. The danger is then that bad tablets are no longer guaranteed to be properly sorted out by the sorting nozzle. In addition, given the frequently smooth adjustability of the scraping element, there is no guarantee that the scraping element will be correctly positioned by the operator for the respective tablet size. This can subject the tablets to significant stress while scraping. It can cause the tablets to become damaged or even break. Since bad tablets are normally rejected in the direction in which the tablets are conveyed before the actual scraping process, tablets that are damaged or broken during the scraping process cannot be sorted out. In certain circumstances, bad tablets are therefore fed to the tablet outlet for acceptable tablets.

Based on the explained prior art, the objective of the invention is to provide a scraping device, a rotary press and a method of the aforementioned type by means of which pellets are kept from being damaged by the scraping element, and bad tablets are guaranteed to be reliably sorted out.

BRIEF SUMMARY OF THE INVENTION

For a scraping device of the aforementioned type, the object of the invention is achieved in that at least one scraping element has at least one identification and/or position unit having identification and/or position data relating to the at least one scraping element, the scraping device comprises a read and/or write unit which is designed to communicate with the at least one identification and/or position unit in order to read the identification and/or position data from the at least one identification and/or position unit.

The invention furthermore achieves the object by means of a rotary press of the aforementioned type comprising at least one scraping device according to the invention.

Finally, the invention achieves the object by means of a method of the aforementioned type, wherein the scraping element is arranged above the die plate, and identification and/or position data relating to the scraping element are read out of an identification and/or position unit of the scraping element by means of a read and/or write unit.

The rotary press in which the scraping element according to the invention is used can in principle be designed in a known manner. It normally comprises a so-called die plate with a plurality of openings in which the material to be pressed is pressed. The openings can be so-called die holes. Die sleeves can be arranged in the die holes. This is however not absolutely essential; instead, the press punches can also interact directly with the die holes. The die plate can also be designed as a single piece or consist of die segments. The pellets produced with the rotary press can be tablets. The material to be pressed can be a powder. The function of a scraping element is also known. In particular, tablets are normally conveyed by such a scraping element toward an outlet of the rotary press on the top side of the die plate by means of the lower punch. From there, they can for example enter a discharge channel for properly produced tablets. The scraping element according to the invention can have a sorting unit for bad tablets that do not satisfy the quality requirements. Such a sorting unit can in particular comprise a sorting nozzle by means of which directed compressed air is blown against the pellets to be sorted out so that the pellets can be conveyed into a reject channel. The scraping element according to the invention can have the shape of a crescent, or have a crescent-shaped scraping surface, and can be arranged above the die plate.

In contrast to the prior art, the scraping element according to the invention has an identification and/or position unit containing identification and/or position data, and which can in particular be securely connected to the scraping element. The identification and/or position data allow a predetermined and/or actual position of the respective scraping element to be clearly identified and/or determined. The identification and/or position unit can for example be an encoded chip or the like. By means of the read and/or write unit, and especially a read and/or write device, the identification and/or position data are read out of the identification and/or position unit. Identification and/or position data can also be written by the read and/or write unit into the identification and/or position unit. On the basis of the read-out data, a clear identification and/or determination of a predetermined and/or actual position of the scraping element is available that can be taken into consideration when operating the press. In particular, it is possible to check whether the used scraping element is the correct scraping element for the pellets to be produced, and/or whether the scraping element is correctly positioned. Thus, damage to the pellets due to an incorrect or incorrectly positioned scraping element or a flawed sorting of bad tablets can be avoided. The read and/or write units can be a part of a machine control system of the rotary press.

The at least one scraping element can have a pre-determined stationary position above the die plate, or respectively be arranged at a predetermined stationary position above the die plate. For each scraping element, there hence exists a specified position in which the respective scraping element can be held, in particular without play and/or non-adjustably. This can reliably prevent a malpositioning of scraping elements. With this embodiment, any sorting nozzle that may be present can be optimally aligned at any time relative to the pellets.

Wired communication is possible in principle between the identification and/or position unit and the read and/or write unit. However according to one particularly practical embodiment, the at least one identification and/or position unit comprises at least one transmitting and/or receiving unit, and the read and/or write unit also comprises a transmitting and/or receiving unit by means of which the read and/or write unit for reading out the identification and/or position data wirelessly communicates with the at least one transmitting and/or receiving unit of the at least one identification and/or position unit. The identification and/or position data can also be read out wirelessly. Known communication paths are conceivable in principle such as radio, infrared, Bluetooth, etc.

According to an additional embodiment, the read-out identification and/or position data can be compared with production parameters for the rotary press, especially production parameters relating to a pellet type to be produced by means of the rotary press. The comparison can be performed by the read and/or write unit. It is, however, also conceivable for a control device of the rotary press to perform the comparison. The read and/or write unit can also be integrated in the machine control system. In this embodiment, there is therefore an automatic comparison of the scraping element clearly identified by means of the identification and/or position data with the pellet type to be produced. For example, it can be automatically determined in this manner whether the employed scraping element is appropriate for the size of the pellets to be produced, or whether the scraping element is correctly positioned. The necessary size and/or position of the respective scraping element can be saved in the production parameters. If the comparison between the production parameters and the identification and/or position data yields an impermissible deviation, a warning and/or control signal can be generated. This can also be done by the read and/or write unit, or also a control device of the rotary press. Based on the warning message, an operator can remove the scraping element and exchange it for the correct scraping element. The warning message can comprise a visual and/or acoustic signal. The control signal can be an electrical signal. It can be configured to automatically influence the operating process of the rotary press.

The read and/or write unit can be configured to compare the read-out identification and/or position data with production parameters saved in a control device of the rotary press. The read and/or write unit can communicate with the control device. This communication can be wireless or wired, wherein the aforementioned known methods of radio, infrared, Bluetooth, etc. are conceivable. As noted, the read and/or write unit as well as the control device can be configured to possibly output a warning message and/or a control signal of the specified type. The read and/or write unit can merely serve to read out the identification and/or position data from the identification and/or position unit of the scraping element, and to forward this data to the control device. Of course, it is also conceivable for the read and/or write unit to be integrated in the control device of the rotary press.

According to another embodiment, the identification and/or position unit can comprise at least one position sensor that detects the position of the at least one scraping element above the die plate. In this embodiment, it is therefore possible to automatically recognize the actual position of the respective scraping element. The comparison with a saved target position for a specific rotary press mode can then be made on this basis. The position of the scraping element can then be corrected if necessary. One scraper can be used for all pellet types. The scraping element in this embodiment can be positioned manually in principle. It is, however, also possible to provide additional positioning means by which the at least one scraping element can be automatically brought into a predetermined position above the die plate depending on a position detected by the at least one position sensor. The positioning means can comprise suitable positioning drives. In this embodiment, the respective scraping element is hence automatically checked and corrected if necessary depending on, for example, the pellet type specified by an operator.

It is also possible for the scraping device according to the invention to comprise a plurality of different scraping elements. The different scraping elements can differ in terms of their size and/or a specific position above the die plate. The scraping elements can accordingly each have a predetermined different radial position relative to a circular path along which the openings are located in the die plate provided for the pellets. A different position relates in particular to a different position of the scraping surfaces of the scraping elements. The scraping elements can be adapted to the respective shape and/or a characteristic dimension of the pellet measured in a plane of the die plate. In particular, an individual scraping element can be provided in each case for the pellets to be produced with the rotary press, such as pellets of a different size or different diameter. A specified position can be provided for each of these scraping elements.

The method according to the invention can be carried out by the rotary press according to the invention. Accordingly, the rotary press according to the invention can be suitable to perform the method according to the invention.

BRIEF DESCRIPTION OF THE SEVERAL VIEWS OF THE DRAWINGS

One exemplary embodiment of the invention is explained below in greater detail using figures. They show schematically.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
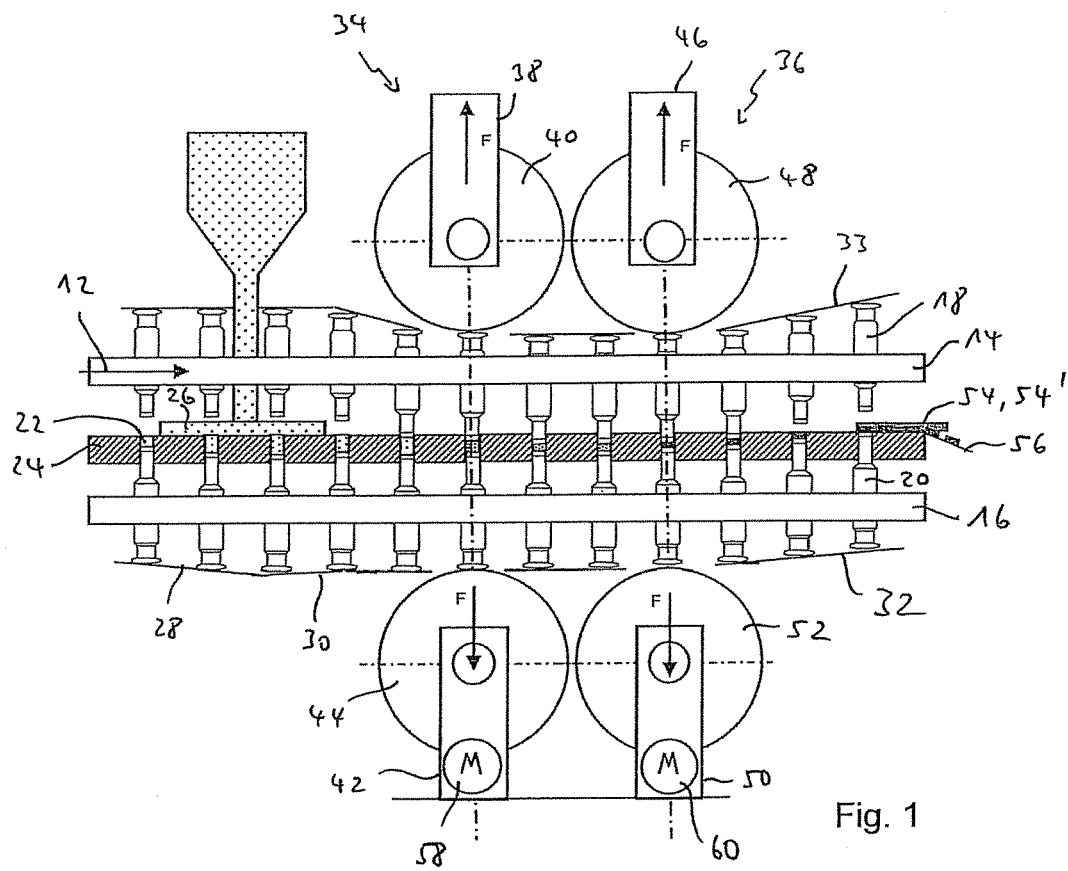
FIG. 1 A part of a rotary press for tablets in a representation depicted in the plane of the drawing, FIG. 2 A plan view of a section of a scraping device according to the prior art, FIG. 3 A plan view of a section of a scraping device according to the invention, and FIG. 4 A scraping device according to the invention in a view from the perspective identified with Z in FIG. 3.

If not otherwise specified, the same reference numbers indicate the same objects. FIG. 1 shows the design of a rotary tablet press that is known. The rotor of the rotary tablet press is depicted that is rotated about a normally vertical axis by a rotary drive (not shown) as illustrated by the arrow 12 (direction of rotation). The rotor possesses an upper punch guide 14 and a lower punch guide 16 to accommodate upper punches 18 and lower punches 20. The upper punches 18 and lower punches 20 interact with openings 22 in a die plate 24 that is arranged between the punch guides 14, 16. The openings 22 are supplied with a powdered press material by means of a filling device 26. The filling device 26 is a part of a filling and dosing station of the press that also comprises filling cam elements 28 and dosing cam elements 30. The rotor also comprises upper lifting cam elements 33 and lower ejection cam elements 32 of an ejector station that accommodates a scraping device 54, 54'.

Downstream from the direction of rotation 12 of the rotor of the filling device 26 is a pre-compression station 34 and a main compression station 36. The pre-compression station 34 possesses an upper compression device 38 with an upper pressure roller 40 and a lower compression device 42 with a lower pressure roller 44. The main compression station 36 also comprises an upper compression device 46 with an upper compression roller 48 and a lower compression device 50 with a lower compression roller 52. The upper and lower punches 18, 20 interact with the compression rollers 40, 44, 48, 52 in a known manner in order to press the press material added to the openings 22 into pellets, especially tablets. The lower compression devices 42, 50 each comprise a motorized drive 58, 60 by means of which the vertical distance between the upper compression rollers 40, 48 and the lower compression rollers 44, 52 can be varied. As illustrated in FIG. 1 by the arrows identified with F, forces interact while the press is operating between the upper or respectively lower punches 18, 20 and the compression rollers 40, 44, 48, 52 or respectively the compression devices 38, 42, 46, 50 that bear them. To measure these forces F, force measuring devices are arranged in at least some, preferably all compression devices 38, 42, 46, 50.

Downstream from the direction of rotation 12 of the pre-compression and main compression station 34, 36 is a scraping device 54, 54' that, in a known manner, supplies tablets that have been pushed by the lower punches 20 onto the surface of the die plate 24 to a tablet discharge 56.

Figure 2:
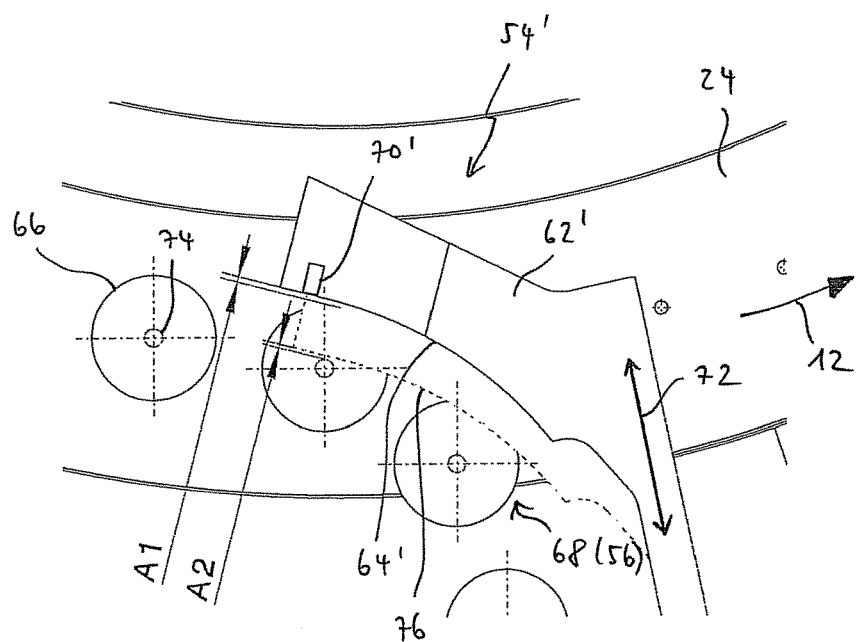

FIG. 2 shows a plan view of a scraping device 54' according to the prior art. A scraping device 62' can be seen that is arranged above the die plate 24, a section of which can be seen in FIG. 2. In FIG. 2, the die plate 24 rotates counterclockwise while operating as illustrated by the arrow 12. The scraping element 62' has an essentially crescent-shaped scraping surface 64'. Tablets 66 produced with the rotary press and conveyed by the lower punches 20 to the top side of the die plate 24 to the position in FIG. 2 come into contact with the crescent-shaped scraping surface 64' of the scraping element 62' along the direction of rotation 12 of the die plate 24, and are supplied thereby to an outlet 68 that for example can lead to a discharge channel of the tablet discharge 56 for correctly produced tablets. The scraping element 62' also possesses a sorting nozzle 70'. Acting as a quality control system, said nozzle feeds tablets 66 that have been identified as bad to a reject channel by means of directed compressed air. The prior art scraping element 62' is smoothly adjustable in a radial direction as indicated by the arrow 72 in FIG. 2. If, instead of the tablets 66 shown for example in FIG. 2, tablets with a significantly smaller diameter are to be scraped off as indicated in FIG. 2 with a dashed line at reference number 74, the scraping element 62' must be adjusted outward in a radial direction to the position indicated by the dashed line at reference number 76. Depending on the tablet diameter or tablet dimension, the scraping element 62' is to be adjusted so that a specified distance exists between the beginning of the crescent-shaped scraping surfaces 64' and the perimeter or respectively edge of the respective tablet 66, 74. The corresponding distances are identified in FIG. 2 as A1 and A2. As explained at the beginning, the danger exists with this known scraping device 54' of damaging the tablets 66, 74 to be scraped off, as well as the danger of inefficiently sorting out bad tablets.

Figure 3:
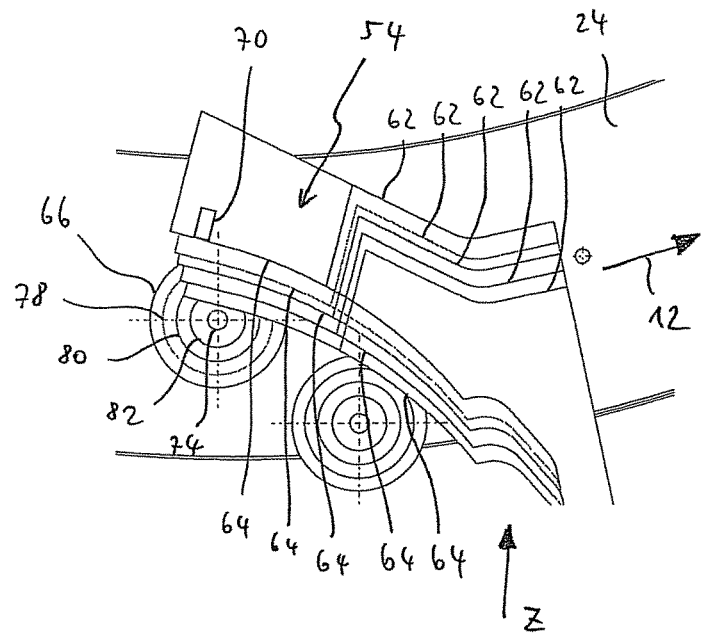

FIG. 3 shows a plan view of a scraping device 54 according to the invention. In FIG. 3 as well, the die plate 24 rotates counterclockwise while operating as illustrated by the arrow 12. The scraping device 54 according to the invention comprises a plurality of scraping elements 62 that are all portrayed in FIG. 3 for reasons of illustration. Of course, only one scraping device 62 is used at a time during operation. Each of the scraping elements 62 possesses a crescent-shaped scraping surface 64. In addition, each of the scraping elements 62 possesses a sorting nozzle 70 which is only depicted for one of the scraping elements in FIG. 3 for reasons of simplicity. As can be seen in FIG. 3, the scraping elements 62 differ according to their size. The crescent-shaped scraping surfaces 64 are arranged in different radial positions along the die plate 24. In particular, they each have a predetermined different radial position in reference to the circular path on which the openings 22 in the die plate are located. Each of the scraping elements 62 possesses a specified position on the die plate 24 in which it is held free of play and non-adjustably. FIG. 3 also shows tablets 66, 74, 78, 80, 82 to be produced with a rotary press according to the invention for the sake of illustration. Of course during operation, only one tablet size is produced at a time and conveyed onto the die plate 24. In FIG. 3, it can be seen that just one suitable scraping element 62 is provided for each tablet diameter. This also ensures that the sorting nozzle 70 is always correctly aligned relative to the tablets 66, 74, 78, 80, 82.

Figure 4:
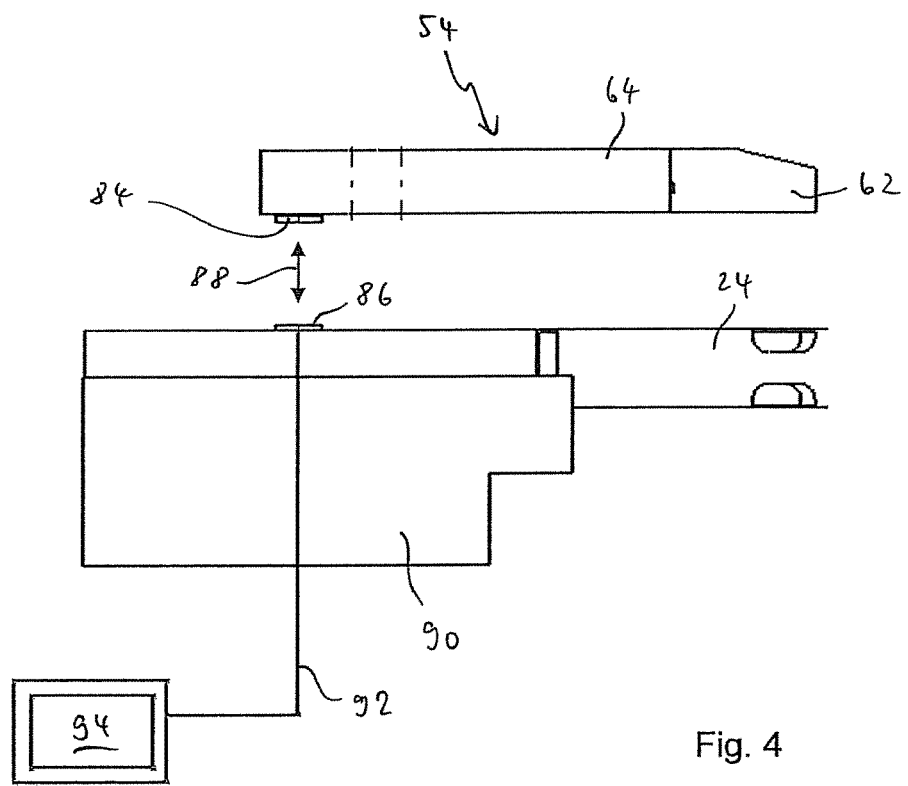

FIG. 4 shows a front view of a highly schematic scraping device 54 from FIG. 3 that results from a perspective identified with "Z" in FIG. 3. It can be seen that the scraping element 62 depicted therein has an identification and/or position unit 84 securely connected thereto. Of course, each of the scraping elements 62 shown in FIG. 3 has such an identification and/or position unit 84. Each identification and/or position unit 84 contains identification and/or position data by means of which the respective scraping element 62 can be clearly identified. The scraping device according to the invention further comprises a read and/or write unit shown at reference number 86. By means of a wireless communication link illustrated at reference number 88, it reads out the identification and/or position data of the scraping element 62 positioned above the die plate 24. For the wireless communication which can be bidirectional, the identification and/or position unit 84 and read and/or write unit 86 each possess a transmitting and receiving unit (not shown). The read and/or write unit 86 can for example be arranged on a column 90 of the scraping device 54. In the depicted example, the read and/or write unit 86 forwards the read-out identification and/or position data by means of a wired connection 92 to a control device 94 of the rotary press according to the invention. The control device 94 performs a comparison of the identification and/or position data of the employed scraping element 62 with associated production parameters of the rotary press. These production parameters are in particular information regarding the diameter or respectively the characteristic dimension of the tablets 66, 74, 78, 80, 82 to be produced. For each tablet diameter to be produced, or respectively for each characteristic tablet dimension to be produced, the identification and/or position data of the correct scraping elements 62, i.e. the scraping element 62 of the appropriate size, is saved in the control device. The control device 94 performs a comparison of the target identification and/or position data saved for the respective tablet diameter, or respectively the respective tablet dimensions, with the identification and/or position data read out by the read and/or write unit 86. If the read-out identification and/or position data do not correspond to the target identification data, a warning signal for an operator and/or a control signal of the aforementioned type is emitted by the control device 94.

It is also possible for the identification and/or position unit to comprise one or more position sensors that detect the position of the at least one scraping element 62 above the die plate 24. The detected position can be saved in the identification and/or position data of the identification and/or position unit 84. A comparison of the detected position with a target position saved in the production parameters can be performed for example by the read and/or write unit 86 or the control device 94. If an impermissible deviation is determined, a warning and/or control signal of the aforementioned type can be output. It is also possible to additionally provide positioning means such as positioning drives by means of which the scraping element 62 is automatically brought into the specified position over the die plate on this basis.

The scraping device 54 according to the invention, or respectively the rotary press according to the invention, and the method according to the invention for operating the rotary press ensure that each scraping element 62 is correctly positioned. At the same time, a check is performed according to the invention of whether the employed scraping element 62 is appropriate for the type of tablet to be produced. If this is not the case, a warning message is output to an operator and/or a control signal of the aforementioned type so that suitable countermeasures can be pursued.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A scraping device for a rotary press for scraping pellets (66) located on a die plate (24) of the rotary press, comprising a plurality of scraping elements (62), the plurality of scraping elements differing in their size and only one of which is used at a time during operation, characterized in that the plurality of scraping elements (62) have at least one identification and position unit (84) having identification and position data relating to the one of the plurality of scraping elements (62) which is used at a time during operation and which is located at a predetermined stationary position above the die plate, the scraping device further comprises a read and write unit (86) which is designed to communicate with the at least one identification and position unit (84) in order to read the identification and position data from the at least one identification and position unit (84), the at least one identification and position unit (84) comprising at least one position sensor, which detects the position of the one scraping element (62) used at a time during operation and which is located at a predetermined stationary position above the die plate (24) and the scraping device further including position means by which the one scraping element (62) located above the die plate can be automatically brought into a position above the die plate in dependence upon a position detected by the at least one position sensor.

2. The scraping device according to claim 1, characterized in that the at least one identification and position unit (84) comprises at least one transmitting and receiving unit, and the read and write unit (86) also comprises a transmitting and receiving unit by means of which the read and write unit (86) for reading out the identification and position data wirelessly communicates with the at least one transmitting and receiving unit of the at least one identification and position unit (84).

3. The scraping device according to claim 1, characterized in that the read and write unit (86) is further designed to match the identification and position data with production parameter.

4. The scraping device according to claim 3, characterized in that the read and write unit (86) is configured to output a warning message and a control signal when the comparison of the production parameters with the identification and position data outside a predetermined deviation.

5. The scraping device according to claim 4, characterized in that the warning message comprises a visual and/or acoustic signal.

6. The scraping device according to claim 4, characterized in that the control signal is configured to automatically influence operating process of the rotary press.

\* \* \* \* \*